United States Patent [19]

Nishimoto

[11] Patent Number: 4,852,703

[45] Date of Patent: Aug. 1, 1989

[54] SHOCK ABSORBER

[75] Inventor: Yukio Nishimoto, Gifu, Japan

[73] Assignee: Kayaba Kogyo K.K, Japan

[21] Appl. No.: 215,577

[22] Filed: Jul. 6, 1988

[30] Foreign Application Priority Data

Jul. 31, 1987 [JP] Japan .................. 62-117749

[51] Int. Cl.[4] .............................. F16F 9/34
[52] U.S. Cl. ................. 188/284; 188/322.13
[58] Field of Search .............. 188/284, 297, 322.11, 188/322.13, 322.22

[56] References Cited

U.S. PATENT DOCUMENTS 4,166,612  9/1979  Freitag et al. ............. 188/284

FOREIGN PATENT DOCUMENTS 2659488  7/1978  Fed. Rep. of Germany ...... 188/284
2011021  7/1979  United Kingdom ............. 188/284

Primary Examiner—Duane A. Reger
Attorney, Agent, or Firm—McGlew & Tuttle

[57] ABSTRACT

A shock absorber adapted to be mounted between a body and a wheel shaft in a vehicle such as a car or a motorcycle for reducing shocks and vibrations derived from a road. The shock absorber includes a sub-cylinder mounted in a cylinder at one end thereof, a rebound cushion mounted in the sub-cylinder at one end thereof, and an oil-lock piston mounted on a piston rod of the cylinder in confronting relation to the interior of the sub-cylinder. As the piston approaches the end of the expanding stroke, the oil-lock piston is fitted in the sub-cylinder, at which time oil in the sub-cylinder is compressed and then flows into an oil chamber below the oil-lock piston via an annular gap around a periphery of the oil-lock piston and a small-diameter hole in the oil-lock piston. Due to the flow resistance of the small-diameter hole, an oil-lock load can be obtained. As the piston arrives at the end of the expanding stroke, the oil-lock piston abuts against the rebound cushion so as to keep a bearing at a head of the cylinder from violent impacts.

8 Claims, 2 Drawing Sheets

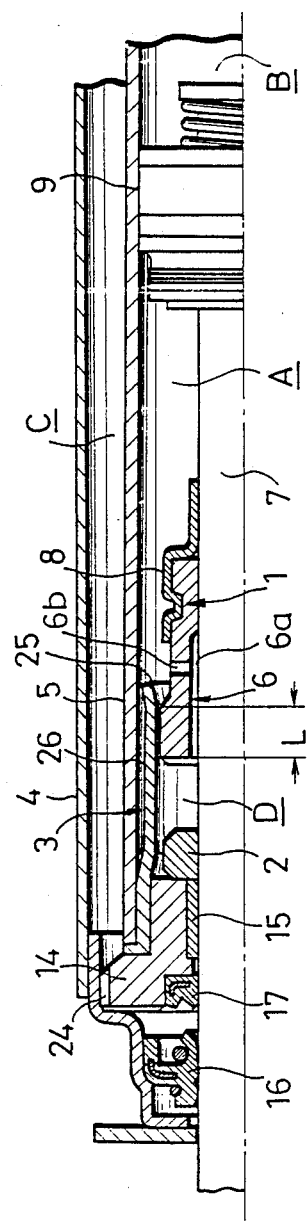
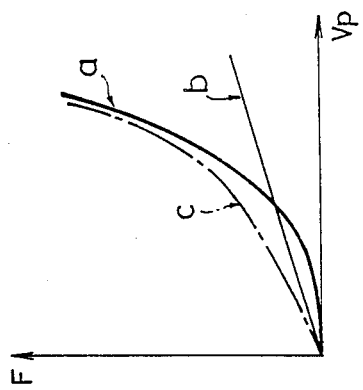
Fig. 1
Fig. 2

SHOCK ABSORBER

BACKGROUND OF THE INVENTION

1. Field of the Invention

The present invention relates to a shock absorber adapted to be mounted between a body and a wheel shaft in a vehicle such as a car or a motorcycle for reducing shocks and vibrations derived from a road.

2. Description of the Prior Art

In many of the conventional shock absorbers, a cushion means is used in order to prevent a piston from violently striking a bearing or a cylinder head when the piston is fully expanded.

For example, it is known to mount a rebound cushion such as one formed of rubber positioned on a periphery of a piston rod; as one formed the piston approaches the end of the expanding stroke, the rebound cushion is brought into contact with the bearing to minimize the impact which the bearing might receive from the piston. A common problem with these conventional shock absorbers is that since the rebound cushion is made of a relatively hard material to last long, an unpleasant impact sound is still created when the rebound cushion strikes the bearing.

Meanwhile, an oil-lock shock absorber has been proposed in my coassigned Japanese Patent Laid-open Publication No. 196432/1987. As illustrated in FIG. 3 of the accompanying drawing, this shock absorber comprises a cylinder 10, a piston rod 12 having a piston 11 movably received in the cylinder 10 so as to divide the cylinder bore into upper and lower oil chambers A, B, a tubular sub-cylinder 18 of circular cross section mounted in the cylinder 10 at one end thereof, and an oil-lock valve 13 mounted on a periphery of the piston rod 12.

The valve 13 of the prior art shock absorber includes a stop having a through-hole 23 and retained by a snap ring 21, a floating casing 20 covering the stop 19, and a leaf valve member 22 disposed at the lower side of the through-hole 23. When the piston approaches the end of expanding stroke, the valve 13 is brought into the sub-cylinder 18 to compress the oil in the sub-cylinder 18. Then the compressed oil flows into the lower oil chamber A via the through-hole 23 and the leaf valve 22. Due to the action of the leaf valve member 22 and the flow resistance of the through-hole 23, an oil-lock load can be achieved.

However, also in this prior oil-lock shock absorber, on unpleasant impact sound is created as the valve 13 strikes the bearing. Further, the adjustment of the oil-lock load can be accomplished only by varying the size of the through-hole 23. Consequently the oil-lock load value is determined due to the characteristic of square of the orifice and hence varies widely, which would cause a staggered oil-lock load.

SUMMARY OF THE INVENTION

It is therefore an object of the present invent to provide a shock absorber which is free of unpleasant impact sounds at the end of the expanding stroke of a piston and in which an oil-lock load can be adjusted in a wide range by changing the varying characteristic from sharp square to gentle proportion and in which the parts for the oil-locking have an adequate degree of strength. Thus the oil-lock load value can be determined with precision.

According to the present invention, a shock absorber comprises a cylinder, a piston rod having at one end a piston movably received in the cylinder, a sub-cylynder mounted in the cylinder at one end thereof, and an oil-lock piston mounted on a periphery of the piston rod and having an annular gap in confronting relation to an interior of the subcylinder. The oil-lock piston has also a small-diameter hole parallel to the annular gap. When the piston approaches the end of its expanding stroke, the oil-lock piston is brought into the sub-cylinder to compress the oil in the sub-cylinder. The compressed oil flows into an oil chamber below the oil-lock piston via the annular gap and the small-diameter hole; due to the combined flow resistance of the small-diameter hole and the annular gap, a predetermined oil-lock load is obtained. At the end of the expanding stroke of the piston, the oil-lock piston is brought into contact with the rebound cushion.

Many other objects, features and addtiional advantages of the present invention will become manifest to those versed in the art upon making reference to the following detailed description and the accompanying sheet of drawings in which a preferred structural embodiment incorporating the principles of the present invention is shown by way of illustrative example.

BRIEF DESCRIPTION OF THE DRAWINGS

FIG. 1 is a fragmentary vertical cross-sectional view of a shock absorber embodying the present invention;

FIG. 2 is a diagram showing the characteristic curves of an oil-lock load; and

DETAILED DESCRIPTION

Figure 3:
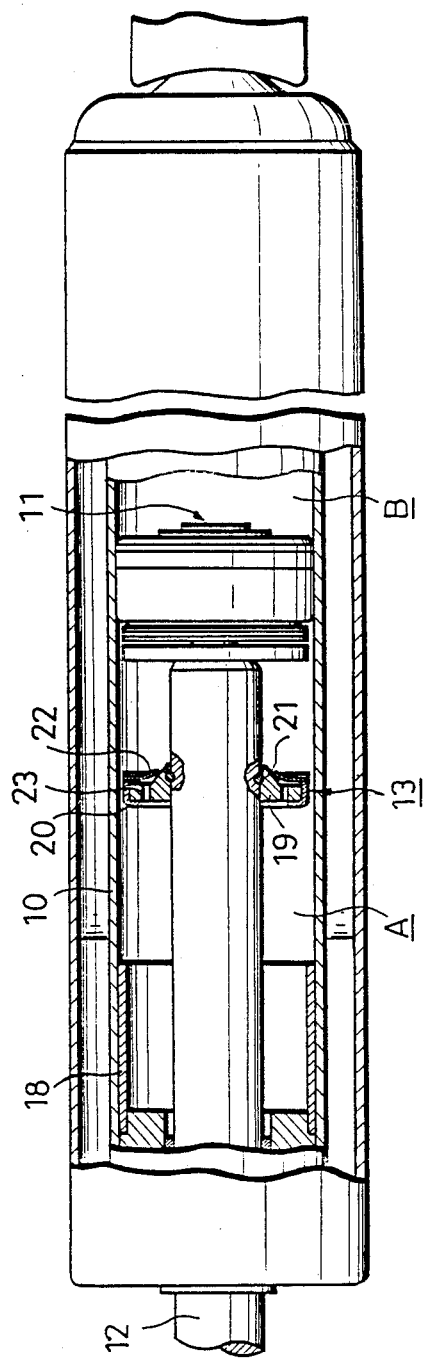
FIG. 3 is a front view, partially broken away, of a conventional shock absorber.

The principles of the present invention are particularly useful when embodied in a shock absorber such as shown in FIG. 1.

The shock absorber generally comprises a cylinder 5, a piston rod 7 having at one end a piston 9 movably received in the cylinder 5. The piston rod 7 extends out of the cylinder 5 through a bearing 14, a bush 15 and a pair of sealing members 16, 17 and is connected at the other end to a body or frame of a vehicle, such as a car, via a bracket.

An outer cylinder 4 is disposed around the cylinder 5 concentrically thereof with a reservoir C defined between the cylinder 5 and the outer cylinder 4. The outer end of the outer cylinder 4 is connected to a wheel shaft of the vehicle via a bracket.

The piston 9 divides the cylinder bore into upper and lower oil chambers A, B, and the lower chamber B communicates with the reservoir C via a base valve.

The shock absorber also includes a tubular sub-cylinder 3 of circular cross section mounted within the cylinder 5 at one end thereof. The sub-cylinder 3 defines therein another oil chamber D opening to the upper oil chamber A. The oil chamber D also communicates with the reservoir C via an inner peripheral gap of the bush 15 and a throughhole 24 of the bearing 14.

The sub-cylinder 3 has a flared open end portion 25 and a reduced-diameter intermediate portion 26. Alternatively, the subcylinder 3 may be uniform in diameter along its entire length.

A rebound cushion 2 is disposed in the sub-cylinder 3 at one end thereof and abuts against the end surfaces of the bearing 14 and the bush 15.

An axially elongated oil-lock piston 1 having a tubular wall of circular cross section of a length L is disposed around the periphery of the piston rod 7 and is retained by a resilient stop 8 secured to the piston rod 7 by welding.

The oil-lock piston 1 and the stop 8 may be fixed to each other, and the oil-lock piston 1 may be removably retained by utilizing the resiliency of the stop 8. In the illustrated example, the resilient stop 8 is provided with an inwardly bulged portion fitted in a peripheral recess in the oil-lock piston 1.

The oil-lock piston 1 has an axial hole 6a opening to the oil chamber D, and a radial hole 6b opening to the oil chamber A. These two holes 6a, 6b serve to discharge the oil in the oil chamber D toward the oil chamber A when the oil-lock piston 1 is received in the sub-cylinder 3. Alternatively, the radial hole 6b may be replaced with a gap between the inner periphery of the oil-lock piston 1 and the outer periphery of the piston rod 7.

When the piston rod 7 approaches the end of the expanding stroke, the oil-lock piston 1 is brought into the sub-cylinder to compress the oil in the oil chamber D. Then the compressed oil flows into the oil chamber A via the annular gap around the periphery of the oil-lock piston 1; due to the combined flow resistance of the holes 6a, 6b and the annular gap, an oil-lock load as a cushion is obtained. FIG. 2 illustrates the relation between the piston speed (X axis) and the oillock load (Y axis), in which a designates a characteristic curve of square due to the small-diameter holes 6a, 6b, b a characteristic curve of proportion due to the annular gap, and c a combined characteristic curve of the curves a and b. Thus it is possible to manufacture the oil-lock shock absorber simply with improved precision. Also it is possible to prevent the piston 9 from violently striking the bearing 14. At the end of the expanding stroke of the piston 9, the oil-lock piston 1 abuts against the rebound cushion 2 which prevents the oil-lock piston 1 from violently striking the bearing 14.

During the return or compressing stroke of the piston 9, the piston rod 7 is lowered so that the oil in the oil chamber A is supplied to the oil chamber D via the radial hole 6b and then the axial hole 6a.

If the oil-lock piston 1 is made of synthetic resin, it is possible to center the oil-lock piston 1 with respect to the subcylinder 3 by utilizing the resiliency of the oil-lock piston 1.

The flared open end portion 25 of the sub-cylinder 3 serves as a guide to assist in inserting the oil-lock piston 1 into the sub-cylinder 3. The reduced-diameter intermediate portion 26, which has an adequate degree of resiliency, of the sub-cylinder 3 serves to assist not only in centering the sub-cylinder 3 with respect to the oillock piston 1 but also in fitting the oil-lock piston 1 in the sub-cylinder 3 tightly.

With the oil-lock shock absorber of the present invention, the following advantageous results can be achieved:

(1) When the piston approaches the end of its expanding stroke, the oil-lock piston is brought into the sub-cylinder to exhibit the characteristic of proportion due to an annular gap so that an oil-lock load is obtained by the combination of the characteristic of proportion with the characteristic of square due to the small-diameter holes. Consequently it is possible to minimize the varying of the load value. Further since the oil-lock piston abuts only against the rebound cushion at the end of the expanding stroke of the piston, it is possible to prevent the oil-lock piston from violently striking the bearing, thus eliminating unpleasant impact sounds.

(2) It is possible to adjust the oil-lock load by varying the peripheral length of the oil-lock piston and the size of the small-diameter hole. Thus a wide range of determining the oil-lock load value can be achieved.

(3) If the oil-lock piston is made of synthetic resin, it is possible to center the oil-lock piston with respect to the sub-cylinder due to the resiliency of the synthetic resin. It is possible to prevent the occurrance of unpleasant vibration and sound, even if the sub-cylinder is made of either metal or synthetic resin.

(4) In the event that the stop is fixedly secured to the piston rod by welding, the oil-lock piston and the stop have an adequate degree of strength. Therefore this arrangement is particularly advantageous when used in a shock absorber which requires a high oil-lock load.

(5) If the oil-lock piston is retained under the resiliency of the stop, easy removal of the oil-lock piston for replacement can be achieved.

What is claimed is:

1. A shock absorber comprising:
(a) a combined cylinder composed of concentric inner and outer cylinders defining therebetween a reservoir, said inner cylinder communicating with said reservoir via first damping means;
(b) a piston rod having at one end a piston movably received in said inner cylinder, said piston having second damping means;
(c) a sub-cylinder mounted in said inner cylinder at one end thereof;
(d) a rebound cushion mounted in said sub-cylinder at one end thereof; and
(e) an oil-lock piston fixedly mounted on a periphery of said piston rod and having an annular gap in confronting relation to an interior of said sub-cylinder, said annular gap being adapted to form an annular choke orifice when rebounding, said oil-lock piston having a small-diameter hole for allowing a bypass flow to said annular gap.

2. A shock absorber according to claim 1, wherein said subcylinder is a tube having a flared open end.

3. A shock absorber according to claim 1, wherein said hole is composed of an axial hole portion and a radial hole portion communicating with said axial hole portion.

4. A shock absorber according to claim 1, further comprising: an outer cylinder disposed about said cylinder and a second damping means including means poviding restricted fluid communication between said inner fluid space of said sub-cylinder and an outer fluid space defined between said outer cylinder and said cylinder.

5. A shock-absorber, comprising:
a cylinder;
a piston rod attached to a piston movably received in said cylinder, said piston cooperating with said cylinder to define a first fluid space and a second fluid space, said second fluid space being separated from said first fluid space by said piston;
a subcylinder mounted in said cylinder at a first end of said cylinder within said second fluid space;
an oil lock piston mounted on a periphery of said piston rod within said second fluid space, said oil lock piston having an outer periphery spaced from an inner periphery of said subcylinder when said oil lock piston is moved within said subcylinder, said oil lock piston defining a channel extending from an oil lock piston lower end to a location between said oil lock piston lower end and an oil lock piston upper end, said subcylinder, said oil lock periphery and said oil lock piston channel defining a damping means for damping the movement of said piston rod as said oil lock piston enters said sub-cylinder.

6. A shock absorber according to claim 5, wherein: a fluid space is defined between said cylinder and said subcylinder, said fluid space being in communication with said second fluid space of said cylinder, fluid in said fluid space resisting an outward movement of said sub-cylinder upon said oil lock piston entering said sub-cylinder.

7. A shock absorber comprising:
a cylinder; a piston adapted for reciprocal movement within said cylinder; a piston rod attached to said piston, said piston and cylinder defining a first fluid chamber and a second fluid chamber, said piston and cylinder preventing communication between said first fluid chamber and said second fluid chamber, said piston rod passing through said second fluid chamber; piston rod damping means for damping the movement of said piston rod as said piston approaches a first end of said cylinder, said damping means including a flexible sub-cylinder positioned at said first end of said cylinder, said flexible sub-cylinder defining an outer subcylinder fluid space, between said sub-cylinder and said cylinder and said flexible sub-cylinder defining an inner sub-cylinder fluid space, an oil lock piston mounted on a periphery of said piston rod including an oil lock piston peripheral portion adapted to slide within said sub-cylinder and a channel portion providing communication between said sub-cylinder inner fluid space and said second fluid chamber.

8. A shock absorber according to claim 7, wherein: said sub-cylinder has an upper portion which is flared in a direction toward said cylinder to facilitate entry of the periphery of said oil lock piston into said sub-cylinder.

* * * * *